US005784050A

United States Patent [19]
Corry

[11] Patent Number: 5,784,050
[45] Date of Patent: Jul. 21, 1998

[54] SYSTEM AND METHOD FOR CONVERTING VIDEO DATA BETWEEN THE RGB AND YUV COLOR SPACES

[75] Inventor: Michael Kenneth Corry, Plano, Tex.

[73] Assignee: Cirrus Logic, Inc., Fremont, Calif.

[21] Appl. No.: 563,507

[22] Filed: Nov. 28, 1995

[51] Int. Cl.$^6$ .................................................. G09G 1/28
[52] U.S. Cl. ............................................................. 345/154
[58] Field of Search ............................ 345/154; 348/675, 348/660

[56] References Cited

U.S. PATENT DOCUMENTS

| | | | |
|---|---|---|---|
| 4,507,676 | 3/1985 | Dischert et al. | 348/660 |
| 5,124,688 | 6/1992 | Rumball | 345/154 |
| 5,233,684 | 8/1993 | Ulichney | 395/131 |
| 5,341,318 | 8/1994 | Balkanski et al. | 364/725 |
| 5,389,949 | 2/1995 | Nakada et al. | 345/154 |
| 5,396,346 | 3/1995 | Nakayama et al. | 358/448 |
| 5,402,513 | 3/1995 | Schafer | 382/298 |
| 5,416,614 | 5/1995 | Crawford | 358/530 |
| 5,438,635 | 8/1995 | Richards | 382/232 |
| 5,506,604 | 4/1996 | Nally et al. | 345/154 |
| 5,510,852 | 4/1996 | Shyu | 345/154 X |
| 5,572,236 | 11/1996 | Feig et al. | 345/154 |
| 5,604,514 | 2/1997 | Hancock | 345/154 |

OTHER PUBLICATIONS

Schroeder, Erica, "Multiple Technology Advances Spur Graphics Performance," PC Week, vol. 11, No. 38, p. 41.
Corcoran, Cate T., "Cirrus' Integrated Chips Deliver More Affordable Motion Video" InfoWorld, Sep. 26, 1994, p. 42.
"MVA Supports Multiple Platforms'" Electronics, Sep. 26, 1994, p. 42.
Cataldo, Anthony, "WD, Cirrus Show Video Playback ICs," Electronic News, Oct. 10, 1994, vol. 40, No. 2035, p. 66.
Bursky, Dave, "MPEG Puts Quality Video on PCs," Oct. 14, 1994, vol. 42, No. 21, p. 51.
"New Product," Computer World, Nov. 7, 1994, p. 53.

*Primary Examiner*—Raymond J. Bayerl
*Assistant Examiner*—Seth D. Vail
*Attorney, Agent, or Firm*—Fulbright & Jaworski; Steven A. Shaw

[57] ABSTRACT

A color space converter that uses a set of simple coefficients to convert data between the RGB and YUV color spaces. The converter utilizes conversion circuitry operable to receive RGB data. The R, G, and B components of the RGB data are then converted into YUV data according to the formulae:

$$Y = \tfrac{1}{4}R + \tfrac{1}{2}G + \tfrac{1}{4}B;$$

$$U = -\tfrac{1}{8}R - \tfrac{1}{4}G + \tfrac{3}{8}B;$$

$$V = \tfrac{3}{8}R - \tfrac{1}{4}G - \tfrac{1}{8}B;$$

The YUV data can then be reconverted into the RGB color space by using the formulae:

$$R = Y + 2V;$$

$$G = Y - U - V;$$

$$B = Y + 2U.$$

A preferred embodiment of the present invention is as a VGA controller within a data processing system. The VGA controller is operable to receive data in the RGB color space. The RGB data is then converted into the YUV color space using the above formulae and stored within a memory. The YUV data is retrieved from the memory, converted back into the RGB color space, and then displayed by a display system.

22 Claims, 3 Drawing Sheets

FIG. 1  $100\begin{cases} Y = 1/4R + 1/2G + 1/4B \\ U = -1/8R + -1/4G + 3/8B \\ V = 3/8R + -1/4G + -1/8B \end{cases}$ FIG. 2A  $\begin{bmatrix} Y \\ U \\ V \end{bmatrix} = \begin{bmatrix} 2 & 4 & 2 \\ -1 & -2 & 3 \\ 3 & -2 & -1 \end{bmatrix} \cdot \begin{bmatrix} R \\ G \\ B \end{bmatrix} \div 8$ FIG. 2B  $\begin{bmatrix} Y \\ U \\ V \end{bmatrix} = \begin{bmatrix} 2 & 4 & 2 \\ -1 & -2 & 4-1 \\ 4-1 & -2 & -1 \end{bmatrix} \cdot \begin{bmatrix} R \\ G \\ B \end{bmatrix} \div 8$ FIG. 2C  $\begin{bmatrix} Y \\ U \\ V \end{bmatrix} = \left(\begin{bmatrix} 2 & 4 & 2 \\ -1 & -2 & -1 \\ -1 & -2 & -1 \end{bmatrix} + \begin{bmatrix} 0 & 0 & 0 \\ 0 & 0 & 4 \\ 4 & 0 & 0 \end{bmatrix}\right) \cdot \begin{bmatrix} R \\ G \\ B \end{bmatrix} \div 8$ FIG. 2D  $\begin{bmatrix} Y \\ U \\ V \end{bmatrix} = \left(\begin{bmatrix} 2A \\ -A \\ -A \end{bmatrix} + \begin{bmatrix} 0 & 0 & 0 \\ 0 & 0 & 4 \\ 4 & 0 & 0 \end{bmatrix}\right) \cdot \begin{bmatrix} R \\ G \\ B \end{bmatrix} \div 8$ $A = \begin{bmatrix} 1 & 2 & 1 \end{bmatrix}$

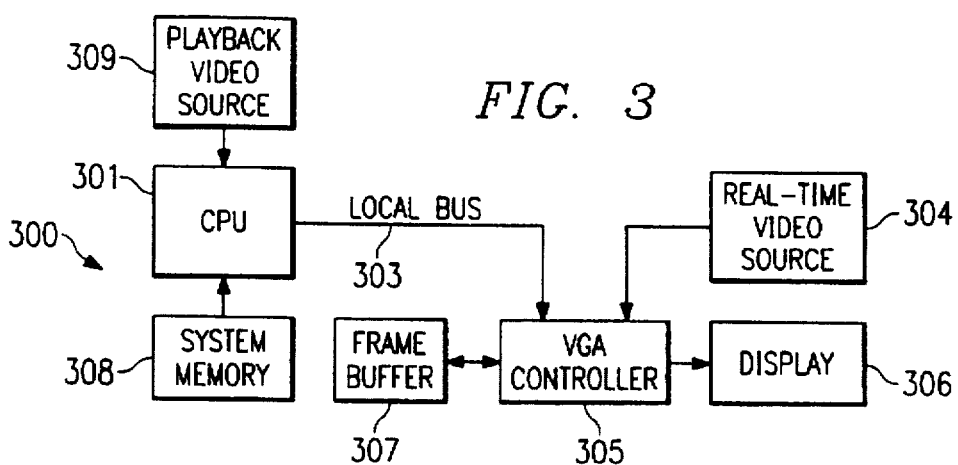

FIG. 3

FIG. 6  $\begin{bmatrix} R \\ G \\ B \end{bmatrix} = \begin{bmatrix} 1 & 0 & 2 \\ 1 & -1 & -1 \\ 1 & 2 & 0 \end{bmatrix} \cdot \begin{bmatrix} Y \\ U \\ V \end{bmatrix}$

SYSTEM AND METHOD FOR CONVERTING VIDEO DATA BETWEEN THE RGB AND YUV COLOR SPACES

FIELD OF THE INVENTION

This invention pertains in general to digital video signal processing and more particularly to a system and method for converting video data from the RGB color space into the YUV color space and back.

CROSS REFERENCE TO RELATED APPLICATION

The following and coassigned U.S. patent application contains related information and is incorporated herein by reference:

U.S. patent application Ser. No. 08/223,845, now U.S. Pat. No. 5,506,604, entitled "Apparatus, Systems and Methods for Processing Video Data in Conjunction with a Multi-Format Frame Buffer," filed Apr. 6, 1994, issued Apr. 9, 1996.

BACKGROUND OF THE INVENTION

As multimedia information processing systems increase in popularity, system designers must consider new techniques for controlling the processing and displaying of data simultaneously generated by multiple sources. In particular, there is a substantial demand for processing systems which have the capability of concurrently displaying both video and graphics data on a single display screen. The development of such systems presents a number of design challenges, not only because of the format differences between graphics and video data, but also because of end user driven requirements that these systems allow for flexible manipulation of data on the display screen.

One particular technique for simultaneously displaying video and graphics data on a single display screen involves the generation of "windows." A stream of data from a selected source is used to generate a display window within a particular region of the display screen. The selected data stream generating the display window "overlays" or "occludes" the data from the nonselected data streams which lie "behind" the displayed data.

In the multimedia environment, the windowing described above yields substantial advantages. Among these advantages are the ability to change the size and location of a window and to manipulate the content and appearance of the data being displayed. For example, graphics and video can be advantageously combined to create custom composite visual displays by combining multiple video and graphics data streams.

In order to efficiently control windows in a multimedia environment, efficient frame buffer management is required. Specifically, a frame buffer control scheme must be used to allow for the efficient storage and retrieval of data. Copending and coassigned U.S. patent application Ser. No. 08/223,845, now U.S. Pat. No. 5,506,604, entitled "Apparatus, Systems and Methods for Processing Video Data in Conjunction with a Multi-Format Frame Buffer," filed Apr. 6, 1994, issued Apr. 9, 1996, and incorporated herein by reference, discloses a high-speed dual-format frame buffer for holding the data in the YUV and RGB formats.

However, even the high-speed frame buffer described in the referenced application has difficulty meeting the bandwidth requirements of the modern multimedia environment. Thus, the referenced application also discloses circuitry for compressing the YUV data in order to save bandwidth. However, RGB data received by the buffer was not compressed, as there was no easy way to convert RGB data into a YUV format suitable for compression. In addition, the industry standard coefficients used to convert RGB into YUV are too complex to convert data in a single PCI bus cycle.

Therefore, there is a need in the art for a fast and efficient system and method for converting RGB data into YUV data. In addition, there is a need in the art for a system and method for conversion that does not visibly degrade the picture represented by the RGB data. Moreover, there must be an easy way to reconvert the YUV back into the RGB format.

SUMMARY OF THE INVENTION

The above and other needs are met by a color space converter that uses a set of simple coefficients to convert data between the RGB and YUV color spaces. The converter utilizes conversion circuitry operable to receive RGB data. The R, G, and B components of the RGB data are then converted into YUV data according to the formulae:

$$Y = \tfrac{1}{4}R + \tfrac{1}{2}G + \tfrac{1}{4}B;$$

$$U = -\tfrac{1}{8}R - \tfrac{1}{4}G + \tfrac{3}{8}B;$$

$$V = \tfrac{3}{8}R - \tfrac{1}{4}G - \tfrac{1}{8}B.$$

The YUV data can then be reconverted into the RGB color space by using the formulae:

$$R = Y + 2V;$$

$$G = Y - U - V;$$

$$B = Y + 2U.$$

A preferred embodiment of the present invention is as a VGA controller within a data processing system. The VGA controller is operable to receive data in the RGB color space. The RGB data is then converted into the YUV color space using the above formulae and stored within a memory. The YUV data is retrieved from the memory, converted back into the RGB color space, and then displayed by a display system.

An advantage made possible by the present invention is the rapid and computationally efficient conversion of video data. The above formulae can preferably be implemented in hardware using standard, low cost, electrical components. Moreover, the conversion of data can be carried out within a single PCI bus cycle.

Another advantage made possible by the present invention is a reduction in the bandwidth necessary to transmit the video data. Video data converted from the RGB into the YUV color space can be compressed to require less bandwidth.

Yet another advantage made possible by the present invention is visually indistinguishable conversion of video data from the RGB into the YUV color space and back. The present invention is designed to provide the proper emphasis to each color component when converting from one color space to another. Therefore, the video data appears the same to a viewer regardless of its color space.

Yet another advantage made possible by the present invention the elimination of color saturation. The coefficients have a maximum variance of 0.75. Accordingly, saturation is impossible because the variance is less than 1.

The foregoing has outlined rather broadly the features and advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a novel set of formulae for converting video data from the RGB color space into the YUV color space;

FIG. 2A illustrates a set of matrices for the formulae of FIG. 1;

FIG. 2B illustrates a set of matrices derived from the matrices of FIG. 2A;

FIG. 2C illustrates a set of matrices derived from the matrices of FIG. 2B;

FIG. 2D illustrates a set of matrices derived from the matrices of FIG. 2C;

FIG. 3 illustrates a functional block diagram of a display system according to the present invention;

FIG. 6 illustrates the inverse of the matrix of FIG. 2; and

DESCRIPTION OF THE PREFERRED EMBODIMENTS

Figure 4:
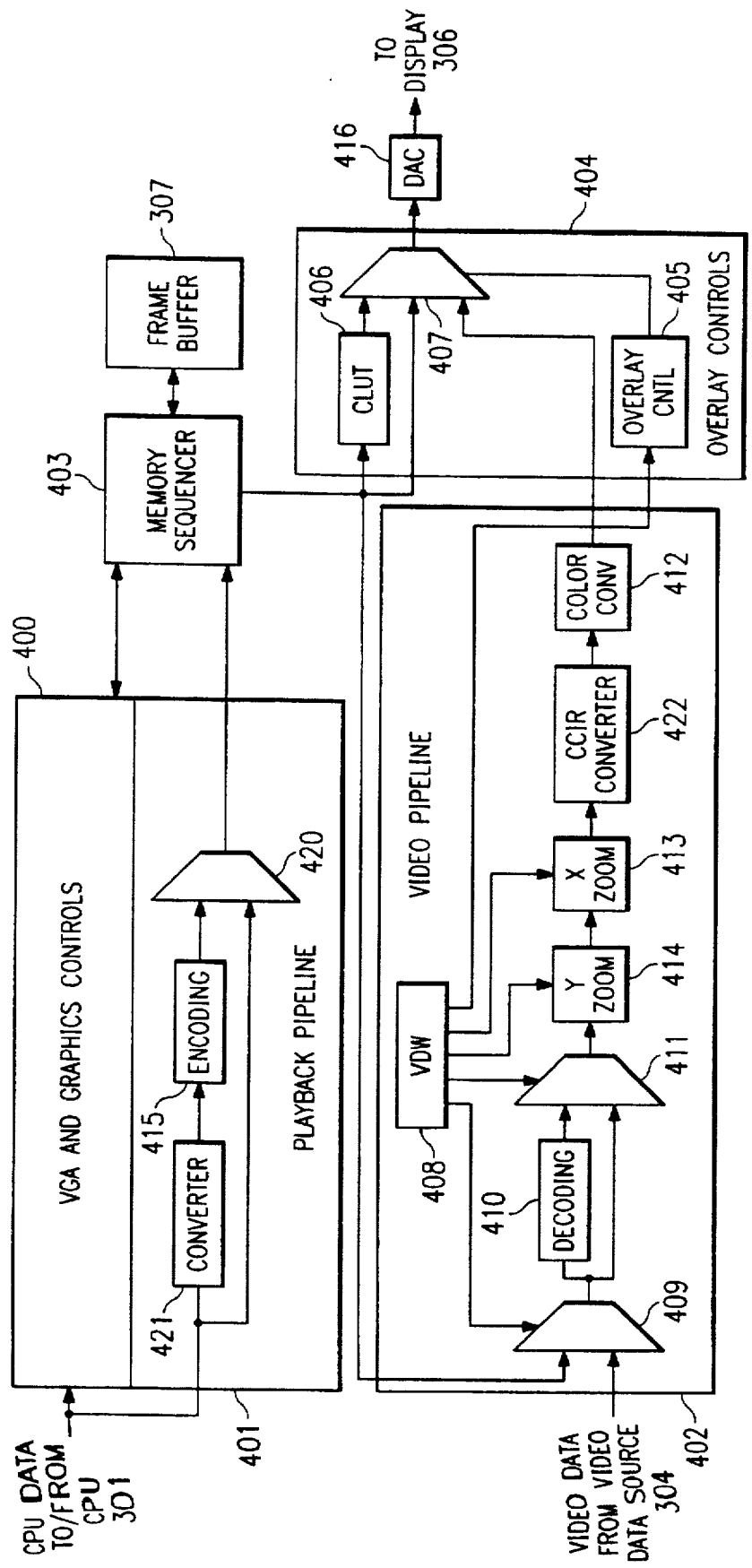
FIG. 4 illustrates a detailed functional block diagram of a VGA controller according to the present invention.

A brief descriptions of the RGB and YUV color spaces, or data formats, is necessary to understand the present invention. The RGB format refers to data in which a pixel of information is represented by the values of its red, green, and blue components. For example, the term "555 RGB" refers to a data format wherein 5 bits each are used to represent the red, green, and blue intensity levels of a single pixel. Accordingly, 555 RGB can be used to define a pixel having one of $(2^5)^3-1$, or 32,767, different colors.

A pixel in the YUV (also called YCrCb) format, in contrast, has a luminance component, Y, and two chrominance components, U and V. The format of YUV data is often described as a ratio, such as YUV 4:2:2, in which the ratio indicates the relative sampling frequencies in the luminance and two chrominance components. The Y component, luminance, conveys the most picture information to a viewer.

The present invention implements a novel set of coefficients operable to convert RGB data into YUV data and back. FIG. 1 shows the coefficients and formulae for converting the red, green, and blue components of a single pixel of RGB data into an equivalent pixel having Y, U, and V components. These coefficients were chosen for two primary reasons: to maintain a color space where green is the dominant color and to maintain a color space that is simple to translate in terms of speed.

The human eye is most sensitive to the green component of color. Therefore, the coefficients were chosen to maximize the influence of the G component of the RGB data. The novel coefficients provide the Y component with twice as much green information as red or blue information. The other YUV components, U and V, are influenced primarily by the blue and red RGB components, respectively, but not to the extent that Y is influenced by the green component.

By using matrix math, moreover, the formulae of FIG. 1 can easily and efficiently be implemented in hardware. FIG. 2A shows the matrix for the formulae of FIG. 1. Note that the coefficients have been multiplied by eight to make the coefficient integers. Using a computer to multiply an operand by "3," however, is a non-trivial task. Therefore, the "3" coefficients of R and B must be removed from the that the "3" can be replaced by "4−1" FIG. 2C shows that the coefficients for Y in the lefthand matrix are 2 times the inverse of the coefficients of U and V. This reduction allows for the calculation of "A" once. "A" may then be subtracted from 4 times B for U and 4 times R for V. "A" can also be multiplied by 2 for Y. Then, Y, U, and V can be divided by 8 to get the final result. Note that each coefficient is an integer power of "2" and, therefore, can easily be manipulated by digital logic. In addition, since the matrices of FIG. 2 avoid fractional components, the resulting YUV color space can be translated back to the RGB color space without losing precision. The hardware necessary to implement the formulae of FIG. 1 as described by the matrices of FIG. 2 will be discussed below.

Moreover, the coefficients of FIG. 1 eliminate the chance of color saturation. Saturation occurs when a color value passes out of its specified bounds. For example, if a component has 5 bits then its has $2^5=32$ possible values. The component becomes saturated when its value passes below 0 or above 31.

Using the coefficients of FIG. 1, the values of the U and V components can only vary between −0.375 and +0.375. Since the total variance is only 0.75, it is impossible for the U or V components to become saturated. However, saturation may be introduced by compression circuitry as described below.

Note that the present invention can be embodied in either hardware or software. However, only the hardware embodiment is discussed below. FIG. 3 is a high level functional block diagram of a display system 300 operable to simultaneously display both graphics and video data according to the principles of the present invention. Display system 300 includes a central processing unit ("CPU") 301 which controls the overall operation of system 300 and generates graphics data defining graphics images to be displayed by system 300.

A playback video source 309 is coupled to CPU 301. Playback video source 309 may be, for example, a hardware device or software which provides data at any frame rate or resolution in the RGB format. Playback source 309 may also be, for example, a Motion Pictures Expert Group ("MPEG") decoder or an INDEO software playback decompressor.

CPU 301 communicates with the remainder of system 300 discussed below via a local bus 303. Local bus 303 is preferably a PCI bus and is controlled by a system clock (not shown) that generates PCI bus cycles.

System 300 also includes a real-time video source 304 which provides digitized video data to be processed and displayed by system 300. Real time video source 304 may be, for example, a videotape unit, television cable outlet, laser disk, CD ROM, MPEG decoder, or other video data source outputting real-time video data in a RGB format at a typical rate of 30 frames per second and typically at resolutions ranging from 640×480 to 1024×768 pixels.

System 300 further includes system memory 308 which stores graphics and video data on a non-real-time basis. System memory 308 may be for example, a CD ROM, floppy disk, RAM, or other type of mass data storage device.

A VGA controller 305 embodying the principles of the present invention is coupled to local bus 303. VGA controller 305 will be discussed in detail below. In general, VGA controller 305 interfaces CPU 301 and/or video source 304 with the system frame buffer 307 and display unit 306. Frame buffer 307 provides temporary storage of the graphics and video data during processing prior to display on display unit 306.

FIG. 4 is a detailed functional block diagram emphasizing VGA controller 305. The primary components of VGA controller 305 include a conventional VGA/graphics controller 400, a video playback pipeline 401, and a video pipeline 402. VGA/graphics controller 400 receives graphics data from CPU 301 via bus 303.

VGA/graphics controller 400, in conjunction with frame buffer 307, processes the received data prior to delivery to the overlay controller 404 and display 306. Video playback pipeline 401 receives stored video data from CPU 301 and system memory 308 in the RGB format, and, as discussed below, converts the RGB video data into the YUV format and packs it into frame buffer 307.

Video pipeline 402 receives either real-time data from real-time video source 304 or video data packed into frame buffer 307 by video playback pipeline 401. Video pipeline 402, among other things, determines when the received video data is to be overlaid as a window on the display screen of display 306, converts received YUV data into the RGB data format, and performs zooming. In the case of video data retrieved from frame buffer 307, video pipeline 402 also unpacks the retrieved data, as will be discussed further below.

A memory sequencer 403 controls and arbitrates accesses to and from frame buffer 307. When displayed, graphics data retrieved from frame buffer 307 through memory sequencer 403 is passed through overlay controls 404 to the digital to analog converter ("DAC") 416. The graphics data stream can be used to either address a color look-up table ("CLUT") 406, the output of which is provided to the first input of an overlay selector 407, or can be passed directly to a second input of overlay selector 407 as true color data. The third input of overlay selector 407 is used to receive video data output from video pipeline 402.

The inputs of overlay selector 407 are selected in response to control signals generated by overlay control circuitry 405 in response to the control signals provided by video window controls 408 in video pipeline 402. The output of overlay selector 407 is provided to DAC 416 which drives display 306.

Video pipeline 402 generally includes video window controls ("DW") 408 which control the transfer of video data from frame buffer 307 to video pipeline 402 and the transfer of video data to display 306 through overlay selector 407. In a preferred embodiment, VDW 408 is constructed as a series of registers, counters, and address generators loaded and controlled by CPU 301. A selector 409 controls whether, depending on the operating mode, data from frame buffer 307 or real-time video data received directly from video source 307 is to be processed. Decoding circuitry 410 unpacks the video data retrieved from frame buffer 307. In an alternate embodiment, decoding circuitry 410 may also be used to decode packed video data received directly from video source 304.

A second selector 411 selects between data output from selector 409 and data output from decoding circuitry 410, depending on whether unpacking is required. Color converter 412 converts the video data from the YUV format to an RGB format compatible with DAC 416 as is further described below. An x-zoomer 413 is provided to expand RGB pixel data on a pixel-by-pixel basis along a given display row. Y-zoomer 414 is provided to perform a y-zoom to expand the incoming video data on a display line basis. CCIR 601 color converter 422 is provided to selectively convert video data in the CCIR 601 YUV format into RGB data.

In the illustrated embodiment, video playback data is passed to video playback pipeline 401 from CPU 301 in a RGB format. Converting circuitry 421 then converts the data into the YUV format. Next, encoding circuitry compresses (packs) the YUV data as described in codending and coassigned U.S. patent application Ser. No. 08/223,845, now U.S. Pat. No. 5,506,604, entitled "Apparatus, Systems and Methods for Processing Video Data in Conjunction with a Multi-Format Frame Buffer," filed Apr. 6, 1994, issued Apr. 9, 1996 A selector 420 is provided for bypassing converting 421 and encoding 215 circuitry when data conversion and packing is not desired or required.

Figure 5:
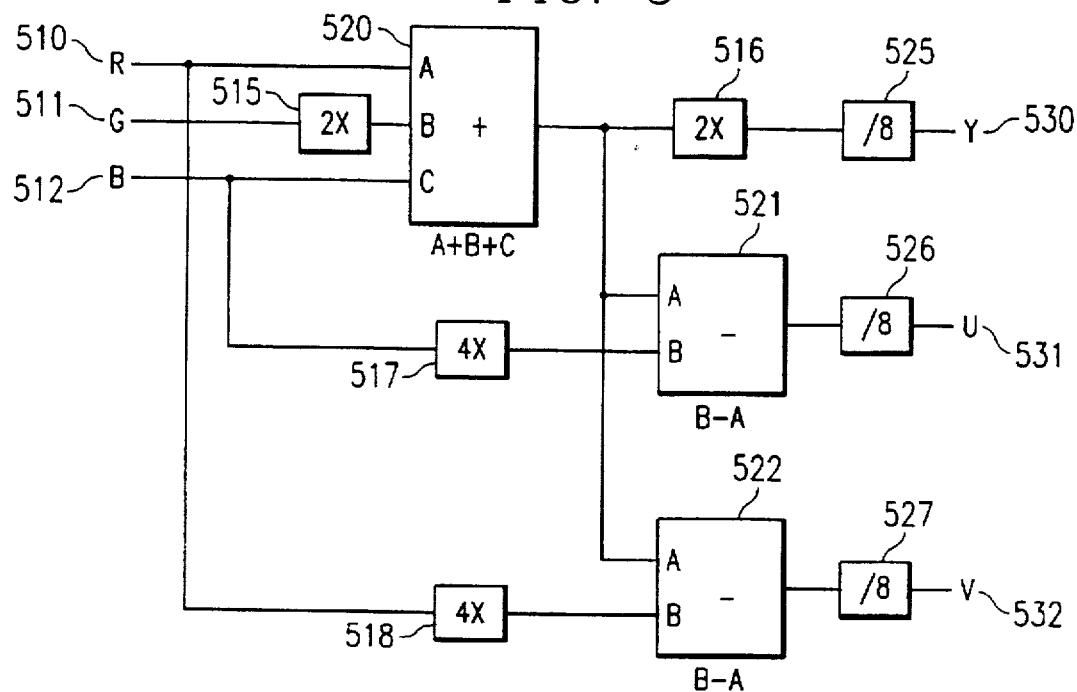
FIG. 5 illustrates a functional block diagram of circuitry operable to convert data from the RGB color space into the YUV color space.

FIG. 5 shows a functional block diagram of the circuitry within converter 421. Converter 421 converts data from the RGB format to the YUV format using the formulae of FIG. 1 as described by the matrices of FIG. 2. Shown are three input lines 510–512 for respectively receiving the red ("R") 510, green ("G") 511, and blue ("B") 512 components of a pixel. Also shown are four multipliers 515-518, three adders 520-522, and three dividers 525–527. Finally, three output lines 530–532 are connected to the outputs of dividers 525–527 and carry the Y, U, and V components of the converted pixel.

As shown in FIG. 5, the R 510 and B 512 input signals are coupled to respective inputs of adder 520. The G 511 input signal is coupled the input of 2× multiplier 515 and the output of the multiplier 515 coupled to an input of adder 520. The adder 520 sums the three inputs to produce an output signal of R+2G+B. This output signal is coupled to an input of 2× multiplier 516, then the output of multiplier 516 coupled to an input of /8 divider 525. The output 530 of divider 525 is the Y component of the YUV pixel corresponding to the input RGB pixel received from inputs 510-512.

The B input signal 512 is coupled to the input of 4× multiplier 517. The output of multiplier 517 is coupled to an input of adder 521. The output of adder 520 is also coupled to an input of adder 521. Adder 521 sums the inverse of adder 520's output and the output of multiplier 517. Thus, the output of adder 521 is −(R+2G+B)+4B. This output is coupled to the input of /8 divider 526. The output 531 of divider 526 is the U component of the YUV pixel corresponding to the input RGB pixel received from inputs 510-512.

The R input signal 510 is coupled to the input of 4× multiplier 518. The output of multiplier 518 is coupled to an input of adder 522. The output of adder 520 is also coupled to an input of adder 522. Adder 522 sums the inverse of adder 520's output with the output of multiplier 518. Thus, the output of adder 521 is −(R+2G+B)+4R. This output is coupled to divider 527. The output 532 of divider 527 is the V component of the YUV pixel corresponding to the input RGB pixel received from inputs 510–512.

Color converter 412 converts the YUV data back into RGB data. FIG. 6 shows the matrix used to covert YUV back to RGB. Note that this matrix is the inverse of that in FIG. 2A.

Figure 7:
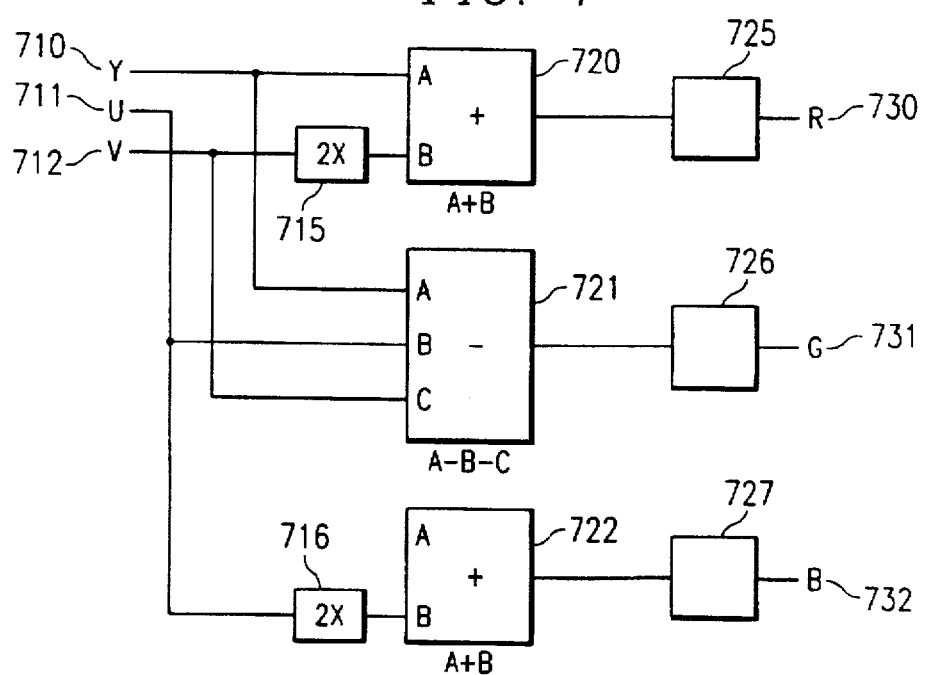
FIG. 7 illustrates a functional block diagram of circuitry operable to convert data from the YUV color space to the RGB color space.

FIG. 7 shows a block diagram of the logic necessary to implement the matrix in FIG. 6. Shown are three input lines 710–712 for receiving the luminance ("Y") 710, first chrominance ("U") 711, and second chrominance ("V") 712 components of a pixel. Also shown are two multipliers 715–716, three adders 720–722, and three saturation logic blocks 725–727. Finally, three output lines 730–732 are connected to the outputs of the saturation logic 725–727 and respectively carry the R, G, and B components of the converted pixel.

As shown in FIG. 7, the Y 710 input signal is coupled to the input of adder 720. The V 712 input signal is coupled the input of 2× multiplier 715 and the output of the multiplier 715 is coupled to an input of adder 720. The adder 720 sums its two inputs to produce an output signal of Y+2V. This output signal is coupled to an input of saturation logic 725. The output 730 of saturation logic 725 is the R component of the RGB pixel corresponding to the input YUV pixel received from inputs 710–712.

The Y 710, U 711, and V 712 input signals are also coupled to the inputs of adder 721. Adder 721 subtracts the U 711 and V 712 signals from the Y 710 signal. Thus, the output of adder 721 is Y−U−V. This output is coupled to the input of saturation logic 726. The output 731 of saturation logic 726 is the G component of the RGB pixel corresponding to the input YUV pixel received from inputs 710–712.

The Y input signal 710 is also coupled to the input of adder 722. The U 711 input signal is coupled to the input of 2× multiplier 716 and the output of the multiplier 716 coupled to an input of adder 725. Adder 722 outputs the sum of its inputs. Thus, the output of adder 722 is Y+2U. This output is coupled to saturation logic 727. The output 732 of saturation logic 727 is the B component of the RGB pixel corresponding to the input YUV pixel received from inputs 710–712.

The saturation logic blocks 525–527 ensure that a pixel component does not become saturated by passing above or below its limits. The blocks 525–527 perform this function by first determining whether a component's value has exceeded its bounds and, if so, by clamping the component's value at either the minimum or maximum permissible value (the boundary value). For example, if saturation logic 525 determines that the output of adder 520 is greater than the maximum permissible value for the R component then saturation logic 525 outputs the maximum permissible value for the R component. Likewise, if the output of adder 521 is a negative value, saturation logic 526 will output the minimum permissible value for the G component (usually "0"). Note that although saturation is not inherent in the conversion circuitry described herein, the compression technique described in copending and coassigned U.S. patent application Ser. No. 08/223,845, now U.S. Pat. No. 5,506,604, entitled "Apparatus, Systems and Methods for Processing Video Data in Conjunction with a Multi-Format Frame Buffer," filed Apr. 6, 1994, issued Apr. 9, 1996, may cause saturation.

Since the multipliers and dividers described in FIGS. 5 and 7 operate in factors of two, the circuitry can be implemented using binary shifts. In addition, the adders can be designed using readily available components. Therefore, the converters described above in FIGS. 5 and 7 can be implemented using inexpensive hardware. Moreover, the converters are fast enough to convert a pixel of data in a single PCI clock cycle.

It is important to note that the preferred embodiments of the converters are designed to work in tandem with the packed data format described in copending and coassigned U.S. patent application Ser. No. 08/223,845, now U.S. Pat. No. 5,506,604, entitled "Apparatus, Systems and Methods for Processing Video Data in Conjunction with a Multi-Format Frame Buffer," filed Apr. 6, 1994, issued Apr. 9, 1996. Therefore, not every pixel of RGB data is directly converted into a corresponding YUV pixel. Rather, the Y components generated from each RGB pixel will be combined with U and V components generated from several RGB pixels to provide a compressed data format.

Although the present invention and its advantages have been described in detail, it should be understood that various changes, substitutions, and alterations can be made herein without departing from the spirit and scope of the invention as defined in the appended claims.

The invention claimed is:

1. Conversion circuitry for converting data having red, green, and blue components into data having Y, U, and V components, comprising:

adding circuitry for adding the red component, two times the green component, and the blue component to produce a first sum and dividing the first sum by four to produce the Y component;

first subtracting circuitry for subtracting the first sum from four times the blue component to produce a second sum and dividing the second sum by eight to produce the U component; and second subtracting circuitry for subtracting the first sum from four times the red component to produce a third sum and dividing the third sum by eight to produce the V component.

2. The conversion circuitry of claim 1, wherein the adding circuitry further comprises:

a first multiplier having a first input receiving the green component and a first output outputting two times the green component;

an adder having a second input receiving the red component, a third input coupled to the first output, a fourth input receiving the blue component, and a second output outputting the sum of the second, third, and fourth inputs;

a second multiplier having a fifth input coupled to the second output and a third output outputting twice fifth input; and a divider having a sixth input coupled to the third output and a fourth output outputting one eighth the sixth input.

3. The conversion circuitry of claim 2, wherein the first and second multipliers and the divider are binary shifts.

4. The conversion circuitry of claim 1, wherein the first subtracting circuitry further comprises:

a first multiplier having a first input receiving the blue component and a first output outputting four times the blue component;

an adder having a second input receiving the first sum, a third input coupled to the first output, and a second output outputting the third input minus the second input; and a divider having a fourth input coupled to the second output and a third output outputting one eighth the fourth input.

5. The conversion circuitry of claim 1, wherein the second subtracting circuitry further comprises:

a first multiplier having a first input receiving the red component and a first output outputting four times the red component;

an adder having a second input receiving the first sum, a third input coupled to the first output, and a second output outputting the third input minus the second input; and a divider having a fourth input coupled to the second output and a third output outputting one eighth the fourth input.

6. Circuitry for converting data having Y, U, and V components into data having red, green, and blue components, comprising:

first adding circuitry for adding the Y component to twice the V component to produce the red component;

subtracting circuitry for subtracting the U component and the V component from the Y component to produce the green component; and second adding circuitry for adding the Y component to twice the U component to produce the blue component.

7. The circuitry of claim 6, further comprising:

circuitry for preventing color saturation by clamping a saturated component at a boundary value.

8. A video processing system, comprising:

means for receiving RGB video data having red, green, and blue components;

means for converting the RGB video data into YUV video data having Y, U, and V components, comprising:

adding circuitry for adding the red component, two times the green component, and the blue component to produce a first sum and dividing the first sum by four to produce the Y component;

first subtracting circuitry for subtracting the first sum from four times the blue component to produce a second sum and dividing the second sum by eight to produce the U component; and second subtracting circuitry for subtracting the first sum from four times the red component to produce a third sum and dividing the third sum by eight to produce the V component;

a memory for storing the YUV video data;

means for retrieving the YUV video data from the memory;

means for converting the YUV video data into reconverted RGB video data having reconverted red, green, and blue components, comprising:

first adding circuitry for adding the Y component to twice the V component to produce the reconverted red component;

subtracting circuitry for subtracting the U component and the V component from the Y component to produce the reconverted green component; and second adding circuitry for adding the Y component to twice the U component to produce the reconverted blue component; and means for sending the reconverted RGB video data to a display device.

9. The video processing system of claim 8, wherein the memory is a frame buffer.

10. The video processing system of claim 8, wherein the means for converting the YUV video data in reconverted RGB video data further comprises:

saturation logic circuitry for preventing color saturation by clamping a saturated component at a boundary value.

11. A color space converter for converting video data from a RGB color space having R, G, and B components into a YUV color space having Y, U, and V components, comprising:

receiving means for receiving the video data in the RGB color space;

first conversion means for converting the video data in the RGB color space into video data in the YUV color space using the formulae:

$Y=\frac{1}{4}R+\frac{1}{2}G+\frac{1}{4}B;$ $U=-\frac{1}{8}R-\frac{1}{4}G+\frac{3}{8}B;$ $V=\frac{3}{8}R-\frac{1}{4}G-\frac{1}{8}B;$ and a memory for holding the video data in the YUV color space.

12. The color space converter of claim 11, further comprising:

retrieving means for retrieving the video data in the YUV color space from the memory; and second conversion means for converting the video data in the YUV color space into reconverted video data in the RGB color space using the formulae:

$R=Y+2V;$ $G=Y-U-V;$ $B=Y+2U.$

13. The color space converter of claim 12, further comprising:

saturation logic means for preventing color saturation by clamping a saturated component at a boundary value.

14. The color space converter of claim 11, wherein the memory is a frame buffer.

15. A method of processing video data, comprising the steps of:

receiving RGB video data having R, G, and B components;

converting the RGB video data into YUV video data having Y, U, and V components, the converting comprising the steps of:

adding the R component, two times the G component, and the B component to produce a first sum and dividing the first sum by four to produce the Y component;

subtracting the first sum from four times the B component to produce a second sum and dividing the second sum by eight to produce the U component; and subtracting the first sum from four times the R component to produce a third sum and dividing the third sum by eight to produce the V component; and storing the YUV video data in a memory.

16. The method of claim 15, wherein the memory is a frame buffer.

17. The method of claim 16, further comprising the step of sending the reconverted RGB video data to a display device.

18. The method of claim 16, further comprising the steps of:

checking the reconverted R, G, and B components for saturation; and if a component is saturated, clamping the value of the saturated component at a boundary value.

19. The method of claim 15, further comprising the steps of:
  retrieving the YUV video data from the memory;
  converting the YUV video data into reconverted RGB video data, the converting comprising the steps of:
    adding the Y component to twice the V component to produce a reconverted R component;
    subtracting the U component and the V component from the Y component to produce a reconverted G component; and
    adding the Y component to twice the U component to produce a reconverted B component.

20. A computer program product having a computer readable medium having computer program logic recorded thereon for converting video data from a RGB color space having R, G, and B components into a YUV color space having Y, U, and V components, comprising:
  receiving means for receiving the video data in the RGB color space; and
  first conversion means for converting the video data in the RGB color space into video data in the YUV color space using the formulae:

$Y = \frac{1}{4}R + \frac{1}{2}G + \frac{1}{4}B;$ $U = -\frac{1}{8}R - \frac{1}{4}G + \frac{3}{8}B;$ and $V = \frac{3}{8}R - \frac{1}{4}G - \frac{1}{8}B.$ 21. The computer program product of claim 20, further comprising:
  second conversion means for converting the video data in the YUV color space into reconverted video data in the RGB color space using the formulae:

$R = Y + 2V;$ $G = Y - U - V;$ and $B = Y = 2U.$

22. The computer program product of claim 21, further comprising:
  saturation prevention means for preventing color saturation by clamping a saturated component at a boundary value.

* * * * *